(12) United States Patent
Chen et al.

(10) Patent No.: US 9,741,016 B2
(45) Date of Patent: Aug. 22, 2017

(54) BUSINESS MODEL DATA MANAGEMENT

(75) Inventors: Zhongming Chen, Scarborough (CA); Hongling Zhang, Markham (CA)

(73) Assignee: International Business Machines Corporation, Armonk, NY (US)

(*) Notice: Subject to any disclaimer, the term of this patent is extended or adjusted under 35 U.S.C. 154(b) by 1078 days.

(21) Appl. No.: 11/230,446

(22) Filed: Sep. 20, 2005

(65) Prior Publication Data
US 2007/0067254 A1    Mar. 22, 2007

(51) Int. Cl.
G06F 17/30     (2006.01)
G06Q 10/10    (2012.01)

(52) U.S. Cl.
CPC ................... G06Q 10/10 (2013.01)

(58) Field of Classification Search
CPC   G06Q 10/00; G06Q 10/06; Y10S 707/99942; Y10S 707/99945
See application file for complete search history.

(56) References Cited

U.S. PATENT DOCUMENTS

| | | | |
|---|---|---|---|
| 6,401,091 B1 | 6/2002 | Butler et al. | |
| 6,621,505 B1 | 9/2003 | Beauchamp et al. | |
| 6,970,844 B1* | 11/2005 | Bierenbaum | ................... 705/39 |
| 2002/0049749 A1 | 4/2002 | Helgeson et al. | |
| 2002/0103658 A1 | 8/2002 | Angal et al. | |
| 2002/0138571 A1 | 9/2002 | Trinon et al. | |

OTHER PUBLICATIONS

Medjahed, Brahim, et al; *Business-to-Business Interactions: Issues and Enabling Technologies*; VLDB Journal (2003) 12:59-85/Digital Object Identifier (DOI) 10.1007/s00778-003-0087-z.
Shegalov, German, et al; *XML-enabled Workflow Management for E-Services Across Heterogeneous Platforms*, VLDB Journal 10:91-103 (2001)/Digital Object Identifier (DOI) 10:1007/s00778010038.

* cited by examiner

*Primary Examiner* — Khanh Pham
(74) *Attorney, Agent, or Firm* — Steven M. Greenberg, Esq.; CRGO Law

(57) ABSTRACT

A business model data management method can include identifying a business object within a business object structure document for a business application, locating data management rules for the identified business object in a business object descriptor document, and executing the located data management rules to represent the identified business object in a database for the business application.

8 Claims, 3 Drawing Sheets

BUSINESS MODEL DATA MANAGEMENT

BACKGROUND OF THE INVENTION

The present invention relates to the field of generic data management and data generation and more particularly to the generation of business model data for use in data generation.

Modern business applications incorporate complicated database schemas and business logic. The business logic of a business application generates, manipulates, and transforms business data which can represent individual business objects of the business application. To manage business data, a user must have strong knowledge of the database schema that defines the table structure and relationships between data in the table, as well as the business logic that defines the structure and relationship of the business objects.

Database management systems tools have been developed which can understand database schemas and which can manage business data accordingly. However, conventional data management tools can manipulate the data elements of a database schema by tables, rows and columns rather than as business objects. Data management tools alternatively have been developed which use the business application itself to manage the underlying business data. In the former circumstance, a data manager must enjoy a familiarity with the database schema for the application without regard for the business objects of the business application. In the latter circumstance, the data manager must enjoy a familiarity with data at the business object level without also enjoying a familiarity with the database schema Every business application has its own implementation and style. In consequence, the data manager for the business application must learn the business application and the underlying logic in order to manipulate the business data. Yet, many business applications provide only limited functionality with which the data manager can manage the business data. For instance, a business application typically can provide the view of business data, but the view often does not permit the data manager to modify the business data. In fact, many business applications do not provide a data management capability at all.

As a special case of data management, testing business applications can often require the creation and management of a set of test business data. The creation of a set of test business data, however, can be complicated by the difficulty in managing business data. Generally, sets of test data are created either through the tedious hand coding of database access instructions such as SQL statements, or through the resource intensive use of the limited data management functions of the business application itself. While tools have been developed to automate the creation of test sets of business data, automating the creation of test data involves strictly the creation of arbitrary data without regard for the business objects of the business application. In this regard, automated tools cannot create deterministic sets of data based upon business rules for the business application.

BRIEF SUMMARY OF THE INVENTION

In one embodiment, a business model data management method can include identifying a business object within a business object structure document for a business application, locating data management rules for the identified business object in a business object descriptor document, and executing the located data management rules to represent the identified business object in a database for the business application.

In another embodiment, a business object data management system can include a data management platform configured for coupling to a business application and a database for storing data representations of business objects in the business application. The system also can include one or more business object structure documents and one or more business object descriptor documents. Finally, the system can include a data engine coupled to the data management platform. The data engine can include programming to identify a business object within one of the business object structure documents for the business application, locate data management rules for the identified business object in one of the business object descriptor documents, and execute the located data management rules to represent the identified business object in the database.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
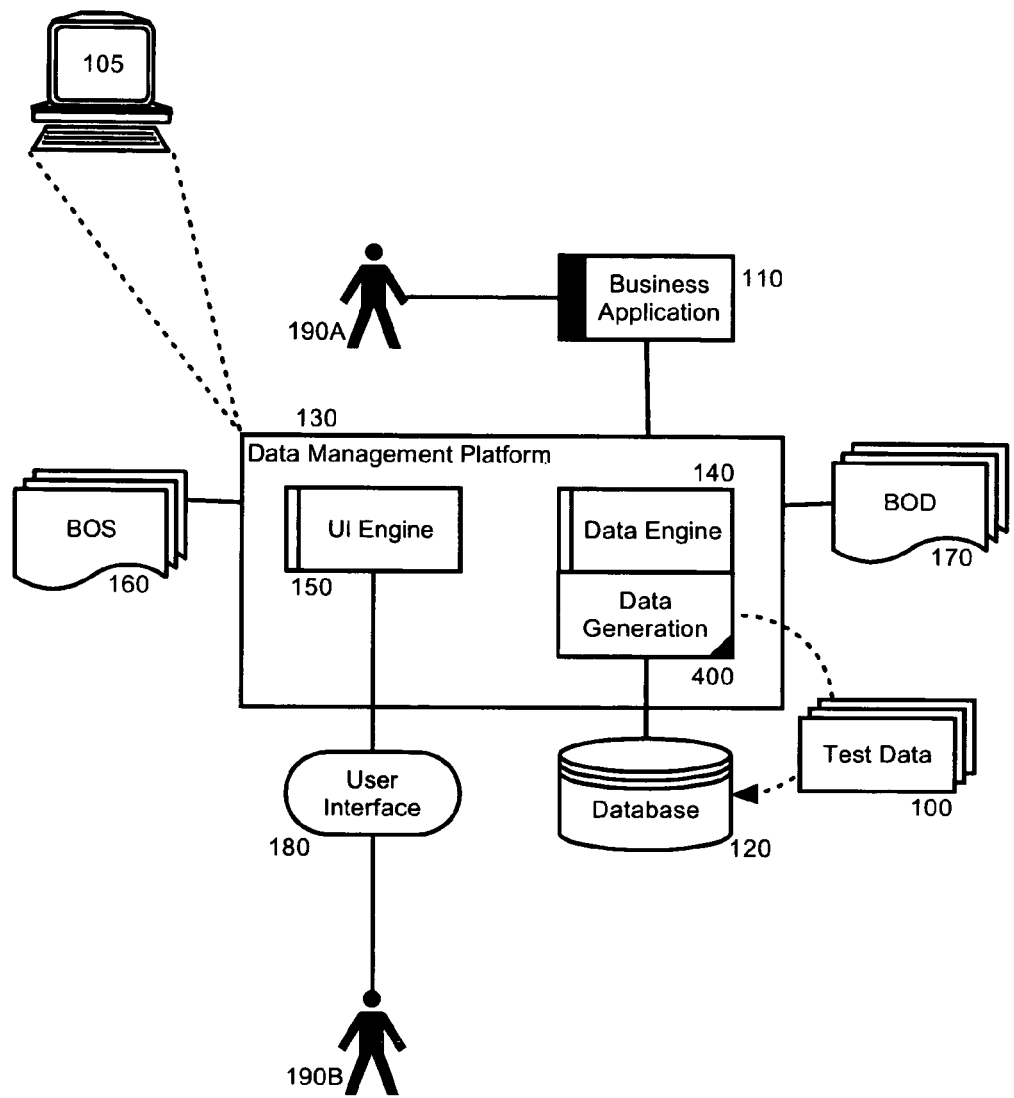
FIG. 1 is a schematic illustration of a business model data management system configured with a data management platform in accordance with the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-usable or computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide a method, system and computer program product for business model data management. In accordance with an embodiment of the present invention, a data management platform can be coupled both to a business object schema for a database associated with a business application, and also to a set of business object descriptors for business objects defined within the business application. A user interface can be produced by the data management platform through which a data manager can manage the business data disposed in the database. In a particular aspect of the invention, test business data can be deterministically generated for the business application based upon the business object descriptors and data generation instructions disposed in the business object schema.

In further illustration, FIG. 1 is a schematic illustration of a business model data management data processing system 105 configured with a data management platform 130 in accordance with one embodiment of the present invention. As shown in FIG. 1, a data management platform 130 can be coupled to a business application 110 and to a database 120 associated with the business application 110. The data management platform 130 can provide a generic interface to the data disposed within the database 120 and the business objects in the business application 110 represented by the data.

The data management platform 130 can be communicatively linked to one or more business object structure documents 160 and one or more business object descriptor documents 170. The business object structure documents 170 each can include markup describing business objects and structure for a specific business scenario. In this regard, the business object structure documents 170 each can include data regarding instances of corresponding business object instances and a relationship between the business object instances. The business object descriptor documents 170, in turn, can include data defining a data rule which can be used to translate business objects into data entries in the database 120. The business object descriptor documents 170 also can include database schema information.

The data management platform 130 can include a data engine 140 and a user interface engine 150. Using both the data engine 140 and the user interface engine 150, the data management platform 130 can transform business objects in the business application 110 into data entries in the database 120 based upon the data rules specified in the business object descriptor documents 170 and the business object instances and structure specified in the business object structure documents 160. Also, the business object descriptor documents 170 can include a user interface rule which can be used to render the generic user interface 180 to a data manager 190B from a business object level perspective. For instance, the generic user interface 180 can be rendered based upon the user interface rule in the business object descriptor documents 170 as well as the business object instances and structure specified in the business object structure documents.

As it will be apparent to the skilled artisan, the data management platform 130 enjoys a generic nature based upon which the data management platform 130 can be reused by different business applications. As such, any dependency on the implementation of individual business applications can be removed. Moreover, the generic nature of the user interface 180 can provide the same look and feel for different business applications, which permits the data manager 190B to manage business data on different applications easily.

In operation, the business object descriptor documents 170 can be produced by a business application developer 190A familiar with the schema of the database 120 at the time of developing the business application 110. The data manager 190B, by comparison, can interact with the user interface 180 rendered by the data management platform 130 to manipulate business objects represented within the business object structure documents 160. The data management platform 130 can transform these business objects and their structure into binary data in the database 120 when the data manager 190B commits the business object structure documents 160 through the data engine 140.

Figure 2:
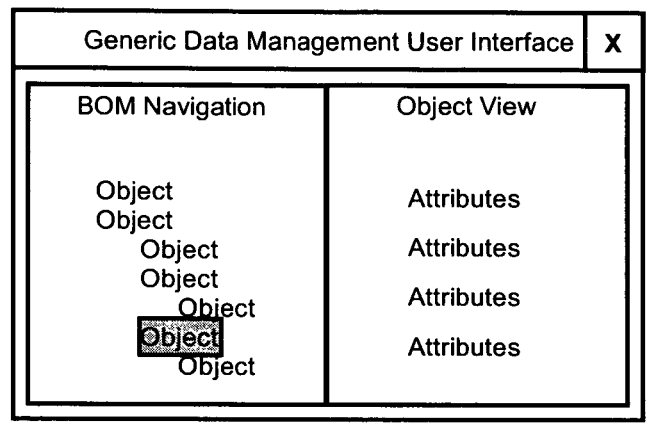
FIG. 2 is a pictorial illustration of a user interface to the data management platform of FIG. 1.

Referring now to FIG. 2, a pictorial illustration is shown of the user interface 180 to the data management platform 130 of FIG. 1. The generic user interface can include a portion in which the business object structure can be rendered in a tree view. Another portion can include a rendering of the detailed attributes of the business object selected in the tree view in the user interface.

In an embodiment of the invention, the business object structure documents can include markup such as the extensible markup language (XML) to present business objects and their corresponding structures. As an example, the business object structure document can include the following structure:

```
<User logonID='Mike'/>
<Organization orgName='IBM'>
    <User logonID='John'/>
</Organization>
``` which maps to the hierarchy having User (Mike) and Organization (IBM) at a first tier in the business object model, and User (John) as a branch of Organization (IBM).

The business object structure documents can define both business object instances and business object associations. Specifically, the business object structure documents can include an identifier of the instance and all attribute values specific to the instance. As such, the data manager can define whether the instance is an array, and the size of the array if applicable. The data manager further can define whether the instance is an existing instance or whether the instance is to be created. If the instance is to be created, the data generation logic can create test data for the business object when the data engine transforms the business object structure documents.

The business object structure documents further can define an association of instances of the business object. For example, two types of associations can be defined: by-value and by-reference. A by-value association can instruct the data engine to create child instance when creating a parent instance. A by-reference association, in contrast, can instruct the data engine not to create child instance when creating a parent instance.

The business object descriptor documents can include an identifier for a business object, applicable attributes for the business object, and a default value for each attribute if any. The business object descriptor documents also can include a data rule for each business object. The rules can be invoked when the data engine locates an instance of the business object in a corresponding business object structure document. In response to locating an instance of the business object in a corresponding business object structure document, the rules can cause the generation of corresponding database commands to transform the business object into binary data in database.

Exemplary rules can include:
a) Rule Create, which will be invoked when a business object instance is created.
b) Rule Post-Create, which will be invoked when all child business object instances have been created for a business object instance.
c) Rule Associate, which will be invoked when a business object instance is associated with another business object instance.

The rules further can include pre-defined or customized actions an exemplary selection which can include:
a) Action Insert-Row, which will instruct the generation of a database command to insert a row into a given table with given column value.
b) Action Update-Row, which will instruct the generation of a database command to update a row in a given table with given column value.
c) Action Delete-Row, which will instruct the generation of a database command to delete a row from a given table matching certain criteria.

User interface rules also can be included for each business object. The user interface rules control how the business objects behave in the user interface and can be interpreted by the user interface engine. Generally, the data manager can add, remove and update the business object structure in the tree view of the user interface. However, those generic operations are governed by the user interface rule defined for each business object. Exemplary user interface rules can include
a) Rule Associate. When object A has a Rule Associate with object B, an instance of A can be added as a child of the instance of B. If the Rule Associate between A and B does not exist, this operation will not be allowed.
b) Rule Mandatory-Associate. Some objects have a hard dependency on other objects. The hard dependency can be enforced by the rule when manipulating business objects.
c) Rule Mandatory-Attribute. Some object attributes are mandatory. If the rule is defined for an attribute, when the object instance is created in the tree view, the attribute can be automatically rendered in the attributes view in which a value can be provided.
d) Rule Read-only-Attribute. An attributed marked read-only cannot be modified through the user interface.

The skilled artisan will recognize that utilizing the data management platform will permit the data manager to focus on the actual business scenario of the business application so as to model the business objects and structures of the business application without having detailed knowledge of the schema of the database. Consequently, a non-technical person having limited training can qualify in the role of data manager. In contrast, the business application developer can provide a business object descriptor document without having a detailed familiarity with the business scenario.

Returning to FIG. 1, data generation logic 400 can be included with the data engine 140. The data generation logic 400 can interpret the business object structure documents 160 and can apply the rules of the business object descriptor documents 170 to generate test data 100 for the business application 110. Specifically, the data generation logic 400 can identify individual objects in the business object structure documents 160. Once an individual object has been identified, the business object descriptor documents 170 can be consulted and a rule can be located. The rule can specify how to represent the individual object in the database 120 according to the preferred schema. Consequently, the data generation logic 400 can execute the rule to create the individual object in the database 120.

Figure 3:
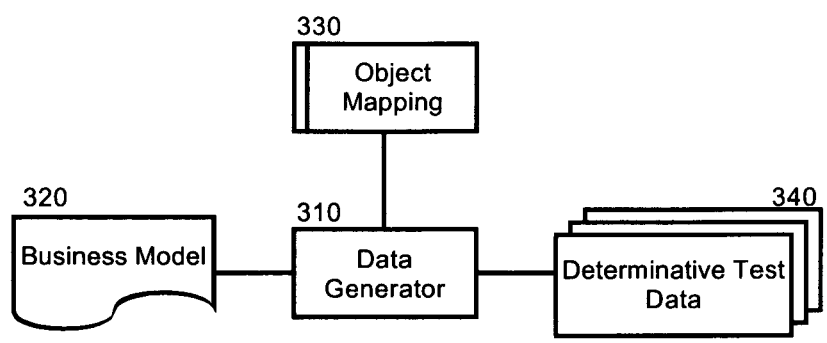
FIG. 3 is a block diagram illustrating a system for deterministically generating test data in the data management platform of FIG. 1; and, FIG. 4 is a flow chart illustrating a process for deterministically generating test data in the data management platform of FIG. 1.

In more specific illustration, FIG. 3 is a block diagram illustrating a system for deterministically generating test data in the data management platform of FIG. 1. The system can include a data generator 310 coupled to object mapping data 330 and a business model 320. The business model 320 can describe high level business objects such as a user name, organization or contact information. The object mapping data 330, in turn, can describe a table schema and business logic required to create a business object in the data management platform. The object mapping data 330 further can specify one or more associations between the business object and other business objects in the data management platform. Utilizing the business model 320 and the object mapping data 330, the data generator 310 can deterministically generate data 340 in customizable formats, such as structured query language (SQL) statements or database loading data that can be loaded into a database for the data management platform using load utilities.

Figure 4:
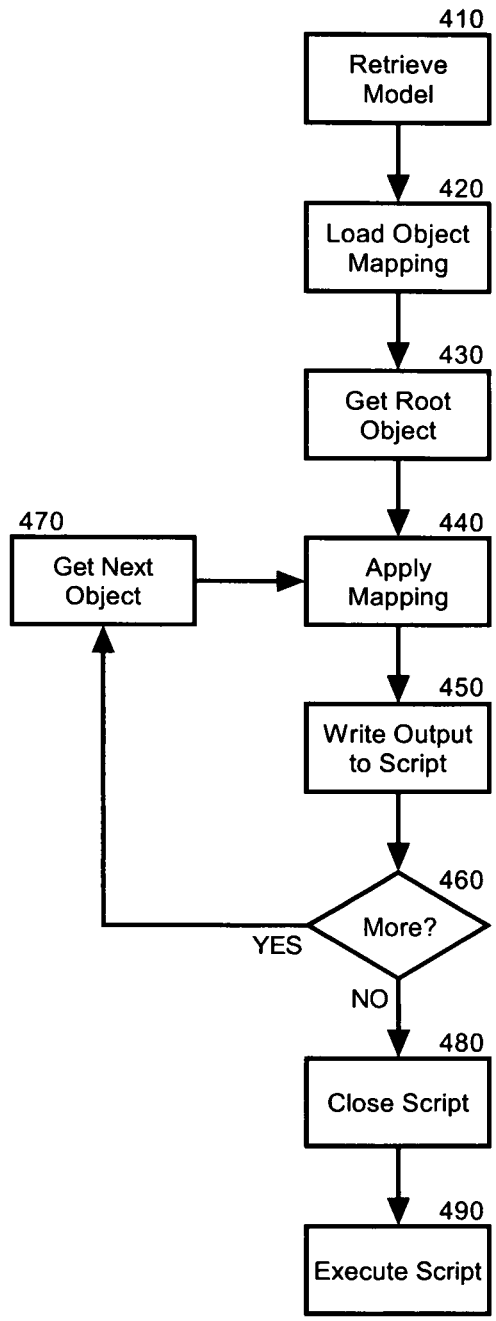

As an example, FIG. 4 is a flow chart illustrating a process for deterministically generating test data in the data management platform of FIG. 1. Beginning in block 410, a business model can be retrieved which can describe a hierarchy of high level business objects in a business application. In block 420, object mapping data can be loaded for the business application. In block 430, a root object can be obtained in the hierarchy and in block 440, one or more rules can be located in the object mapping for the root object and the located rules can be applied to produce a data generation script in block 450. If in decision block 460 additional objects remain to be processed in the hierarchy, in block 470 a next object in the hierarchy can be retrieved and the process can repeat through block 440. When no more objects remain to be processed in the hierarchy, in block 480 the script can be closed and in block 490 the script can be executed to generate the test data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

We claim:

1. A computer-implemented business model data management method comprising:
   loading a business object structure document for a business application into memory of a computer;
   identifying within the document by a processor of the computer a business object;
   responding to the identification of the business object by loading a corresponding business object descriptor document comprising a data management rule specifying how to represent the business object in a database according to a preferred schema, database schema information and a user interface rule used to render a generic user interface to a data manager from a business object level perspective;
   invoking the data management rule for said identified business object the data management rule and responsive to the invocation of the data management rule, directing generation of a corresponding database command of the database transforming the identified business object into binary data in the database based upon the data management rule and the database schema information; and,
   executing said invoked data management rule in the memory of the computer.

2. The computer-implemented method of claim 1, further comprising:
   rendering a hierarchy of business objects described within said business object structure document in a generic user interface.

3. The computer-implemented method of claim 2, further comprising:
   further invoking the user interface rule for said located business object in said business object descriptor document; and,
   limiting interactions with said located business object when rendered in said generic user interface according to said further invoked user interface rules.

4. The computer-implemented method of claim 1, wherein executing said invoked data management rules comprises:
   specifying a number of instances of said located business object to create; and
   creating said specified number of instances of said located business object in said database utilizing said invoked data management rules.

5. A non-transitory computer program product for business object data management comprising a computer useable storage memory device that stores computer usable program code, the computer useable program code comprising:
   computer usable program code configured to load a business object structure document for a business application into memory of a computer;
   computer usable program code configured to identify within the document by a processor of the computer a business object;
   computer usable program code configured to respond to the identification of the business object by loading a corresponding business object descriptor document comprising a data management rule specifying how to represent the business object in a database according to a preferred schema, database schema information and a user interface rule used to render a generic user interface to a data manager from a business object level perspective;

computer usable program code configured to invoke the data management rule for said identified business object the data management rule and responsive to the invocation of the data management rule, directing generation of a corresponding database command of the database transforming the identified business object into binary data in the database based upon the data management rule and the database schema information; and, computer usable program code configured to execute said invoked data management rule in the memory of the computer.

6. The computer program product of claim 5, further comprising computer usable program code configured to render a hierarchy of business objects described within said business object structure document in a generic user interface.

7. The computer program product of claim 6, further comprising:

computer usable program code configured to further invoke the user interface rules for said located business object in said business object descriptor document; and, computer usable program code configured to limit interactions with said located business object when rendered in said generic user interface according to said further invoked user interface rules.

8. The computer program product of claim 5, wherein the computer usable program code configured to execute said invoked data management rule comprises:

computer usable program code configured to specify a number of instances of said located business object to create; and, computer usable program code configured to create said specified number of instances of said located business object in said database utilizing said located data management rules.

* * * * *